United States Patent
Krisher et al.

(10) Patent No.: US 8,640,392 B2
(45) Date of Patent: Feb. 4, 2014

(54) STRUCTURAL DISPLAY HAVING ADJUSTABLE MOUNTING WIDTHS FOR USE IN A RETAIL ENVIRONMENT

(75) Inventors: Caleb Krisher, Appleton, WI (US); David L. Knoll, Oneida, WI (US)

(73) Assignee: Hobart Brothers Company, Troy, OH (US)

( * ) Notice: Subject to any disclaimer, the term of this patent is extended or adjusted under 35 U.S.C. 154(b) by 524 days.

(21) Appl. No.: 12/248,566

(22) Filed: Oct. 9, 2008

(65) Prior Publication Data

US 2009/0094905 A1    Apr. 16, 2009

Related U.S. Application Data

(60) Provisional application No. 60/979,267, filed on Oct. 11, 2007.

(51) Int. Cl.
*E04H 1/12*     (2006.01)
*A47B 47/00*    (2006.01)

(52) U.S. Cl.
USPC .......................................... 52/36.2; 211/189

(58) Field of Classification Search
USPC ............... 52/92.1, 92.2, 92.3, 93.1, 633, 634, 52/636, 638, 639, 690, 692, 693, 691, 52/36.4, 36.5, 36.6, 36.1, 36.2; 211/189, 211/191
See application file for complete search history.

(56) References Cited

U.S. PATENT DOCUMENTS

| | | | |
|---|---|---|---|
| 321,939 A * | 7/1885 | Bates | 52/534 |
| 2,642,825 A * | 6/1953 | McElhone et al. | 52/641 |
| 2,987,195 A * | 6/1961 | Smith | 211/175 |
| 2,998,107 A * | 8/1961 | Zimmerla | 52/36.6 |
| 3,539,108 A * | 11/1970 | Lillibridge et al. | 239/209 |
| 3,760,550 A * | 9/1973 | Mueller et al. | 52/641 |
| 4,488,652 A * | 12/1984 | Hinton et al. | 211/183 |
| 4,919,282 A * | 4/1990 | Duff et al. | 211/134 |
| 4,936,565 A | 6/1990 | Fredrickson | |
| 5,611,442 A * | 3/1997 | Howard | 211/187 |
| 5,901,522 A * | 5/1999 | Slater | 52/641 |
| 5,933,992 A | 8/1999 | Padiak et al. | |
| 6,430,887 B1 * | 8/2002 | Daudet | 52/641 |
| 6,634,152 B1 * | 10/2003 | Pilkinton | 52/641 |
| 6,907,695 B2 * | 6/2005 | Pierce | 52/66 |
| 7,165,360 B2 * | 1/2007 | Thompson | 52/36.1 |
| 7,273,210 B2 * | 9/2007 | Thurston et al. | 269/37 |
| 7,401,430 B2 | 7/2008 | Lindquist et al. | |

OTHER PUBLICATIONS http://www.lozier.com/Pages/CExtensionUprite.asp; Jan. 9, 2009; 1 page; Lozier.com—Products—Display Shelving—Components.

* cited by examiner

*Primary Examiner* — James Buckle, Jr.
(74) *Attorney, Agent, or Firm* — Boyle Fredrickson, S.C.

(57) ABSTRACT

Overhead truss assemblies for use with retail displays are provided. The assemblies include multiple trusses that are parallel to and spaced from each other, spanning overhead or otherwise elevated and connecting merchandise display racks on opposing sides of an aisle or aligned with and atop a single merchandise display rack. The trusses have horizontal truss segments and define variable mounting widths. The variable mounting widths are established with one or more connector assemblies that cooperate with and move longitudinally along the horizontal truss segments. Each connector assembly includes a captured plate that is slidingly housed inside of the horizontal truss segment, and an insert connected to and moving in unison with the captured plate. Moving the connector assembly inwardly toward a middle portion of the truss defines a relatively narrower mounting width, while moving the connector assembly outwardly toward an end of the truss defines a relatively wider mounting width.

17 Claims, 3 Drawing Sheets

STRUCTURAL DISPLAY HAVING ADJUSTABLE MOUNTING WIDTHS FOR USE IN A RETAIL ENVIRONMENT

CROSS-REFERENCE TO RELATED APPLICATIONS

This utility patent application claims the benefit of and priority to U.S. provisional application 60/979,267, filed Oct. 11, 2007, entitled STRUCTURAL DISPLAY WHICH IS ADJUSTABLE FOR AISLES OF VARYING WIDTHS IN A RETAIL ENVIRONMENT, which is herein expressly incorporated by reference in its entirety, for all purposes.

BACKGROUND OF THE INVENTION

1. Field of the Invention

The present invention relates to devices and structures for displaying retail merchandise and, more specifically, to merchandise display rack systems, including various shelving, racking, or other merchandise-supporting structures.

2. Discussion of the Related Art

In many retail environments, an entire aisle, e.g., the entire lengths of two display racks that face each other on opposing sides of a retail store aisle, is filled with merchandise from a single manufacturer or sold under the same brand. In other words, in some retail environments, a single company's product(s) can occupy a relatively large portion of an aisle or even fill one or more aisles in their entireties.

However, even when a single company's products occupy a substantial portion of an aisle in a store or other retail environment, the ability to display such products and convey, e.g., branding information, is limited by the physical size of the display racks provided by the particular store. In other words, a sales representative for a company that sells product and displays product in a store must advertise or convey other brand-related information within the confines of the display racks themselves, or any ancillary aisle endcap space permitted by the store. By limiting displays of branding information to the physical size of the display racks of a particular establishment, only patrons or pedestrian consumers that can view the aisle endcaps or those that are actually standing in or walking down the aisle can see the branding information.

Typical display racks can be largely standardized and can look objectively plain or neutral in appearance. This can be beneficial to ensure that the display racks do not themselves distract from the merchandise supported thereupon. Furthermore, non-neutral appearing display racks might showcase or present certain merchandise well, while the same non-neutral appearing display racks might not showcase or present other merchandise as well.

Therefore, it could prove desirable to provide structural displays for use in a retail environment that can display branding or trademark information in a manner that is visually conspicuous to patrons or pedestrian consumers that are displaced from a particular aisle that stores corresponding merchandise. For example, it could be desirable to allow patrons in an adjacent aisle to see branding information that is placed at a height that is above the display racks. It could also prove desirable to provide truss assemblies as structural displays that are mounted overhead, spanning over an aisle, that are aesthetically agreeable and visually conspicuous.

It could further prove desirable to provide trusses that can be retrofit and temporarily mounted to existing display racks. The trusses may have connector assemblies that allow variable mounting widths for the trusses, facilitating mounting the trusses over aisles having differing widths or a single aisle with a non-uniform width along its length.

It could provide desirable for the connector assemblies to include a captured plate that can slide within a horizontal truss member, and an insert assembly that extends into a supporting display rack. The captured plate and insert assembly may be movable toward each other so that they clamp the horizontal truss member therebetween for temporarily fixing the connector assembly in location upon the truss.

SUMMARY AND OBJECTS OF THE INVENTION

In light of the foregoing, structural displays having trusses that are adjustable for aisles of varying widths in retail environments are provided. The trusses and corresponding structural displays improve the state of the art by overcoming the aforesaid problems of the prior art. In particular, overhead truss assemblies for use with retail displays are provided. The assemblies may include multiple trusses that are parallel to and spaced from each other, spanning overhead and connecting merchandise display racks on opposing sides of an aisle. The trusses have horizontal truss segments and define variable mounting widths. The variable mounting widths are established with one or more connector assemblies that cooperate with and move longitudinally along the horizontal truss segments. Each connector assembly includes a captured plate that is slidingly housed inside of the horizontal truss segment, and an insert connected to and moving in unison with the captured plate. Moving the connector assembly inwardly toward a middle portion of the truss defines a relatively narrower mounting width, whilst moving the connector assembly outwardly toward an end of the truss defines a relatively wider mounting width.

In some implementations, the retail display system includes a first merchandise display rack defining a first rack height and a second merchandise display rack that is parallel to and spaced from the first merchandise display rack, the second display rack defining a second rack height. An aisle extends between the first and second merchandise display racks, accommodating pedestrian consumers. A truss extends between and connects the first and second merchandise display racks and spans over the aisle, and the truss may define a truss height that is greater than about one-half the height of at least one of the first and second rack heights. In this configuration, the truss is visually conspicuous to pedestrian consumers in an aisle that is adjacent the aisle under the truss.

In some implementations, the truss includes (i) a horizontal truss segment extending between the first and second upright merchandise display racks; and (ii) a connector assembly operably coupled to and movable along a length of the horizontal truss segment. The connector assembly attaches an upper portion of at least one of the first and second merchandise display racks to the truss. The truss can include indicia to convey trademark or advertising information, for example, on a sign that is suspended from the truss for conveying such information.

In some implementations, multiple trusses are provided that are parallel to and spaced from each other. Each of the multiple overhead trusses has first and second sides and defines a variable mounting width. An elongate brace member can span between and connect the multiple overhead trusses to each other, and can support one or more light fixtures therefrom. A first connector assembly may be attached to the first side of the truss and a second connector assembly may be attached to the second side of each of the trusses. The first and second connector assemblies may be movable toward and away from each other, providing the variable mounting width functionality of each of the trusses.

In further embodiments, the trusses are longitudinally spaced from each other by a predetermined distance. For example, the trusses can be spaced at least about three feet from each other, optionally about four feet from each other, or other distances, as desired. In some implementations, the trusses are spaced from each other by a distance that corresponds to a length of a shelf of a retail display that supports the overhead truss assembly. In yet other embodiments, the variable mounting width accommodates mounting the overhead truss assembly over an aisle that is about eight feet wide, optionally about ten feet wide, optionally about fourteen feet wide, or other widths.

In yet further embodiments, each truss can include a gable peak overlying and connected to a horizontal truss segment. A connector assembly is movably attached to the horizontal truss segment, such that a mounting width of the truss can be varied without removing the connector assembly from the horizontal truss segment. The connector assembly may include a captured plate that is slidingly housed in an interior portion of the horizontal truss segment. The connector assembly can also include an insert assembly connected to and moving in unison with the captured plate. The insert assembly may include an end plate and at least one elongate member extending from the end plate. The end plate of the insert assembly can attach to the captured plate such that a wall of the horizontal truss segment is sandwiched between the end and captured plates. In this configuration, the end and captured plates can be selectively drawn nearer each other, providing a clamping force therebetween and temporarily fixing a location of the at least one connector assembly with respect to the horizontal truss segment.

In yet further embodiments, a bottom wall of the horizontal truss segment may include an elongate slot that opens into an interior portion of the horizontal truss segment. The captured plate includes a threaded stem extending therefrom, and the threaded stem can extend entirely through the end plate of the of the insert assembly. Such configuration allows a nut to cooperate with the threaded stem so that when the nut is tightened or loosened, the captured and end plates clamp against or unclamp from the bottom wall of the horizontal truss segment.

Other various features and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE INVENTION

Figure 1:
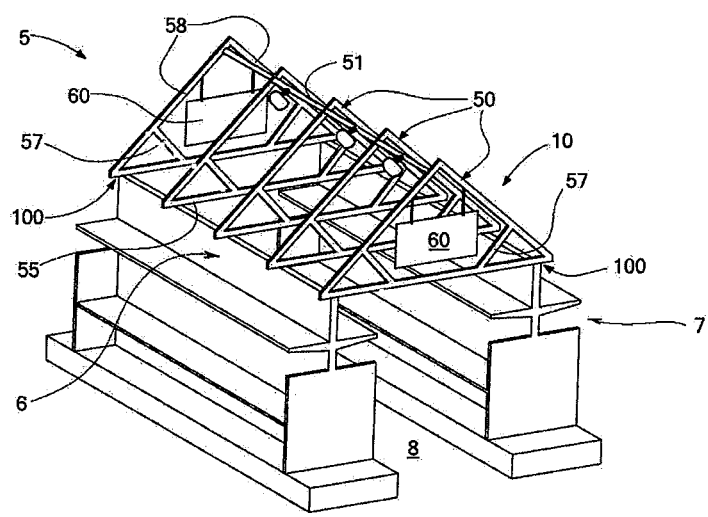
FIG. 1 is a pictorial view of a retail display system having a first truss assembly of the present invention.
Figure 2:
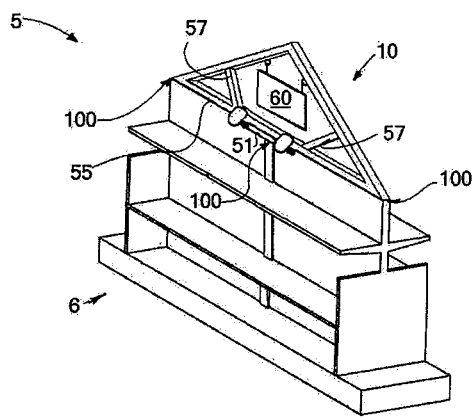
FIG. 2 is a pictorial view of a retail display system having a second truss assembly of the present invention.
Figure 3:
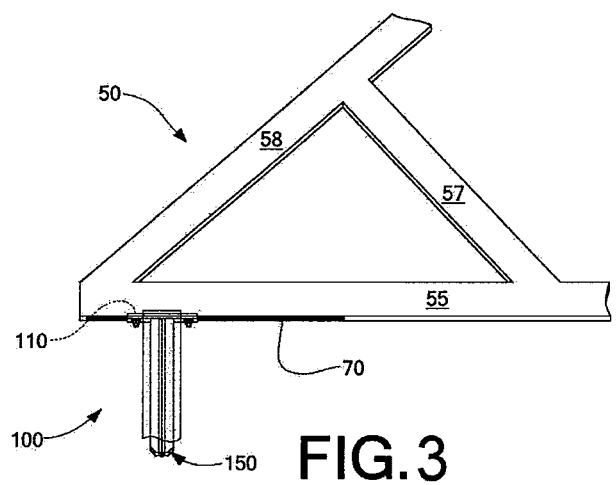
FIG. 3 is a close-up pictorial view of a connector assembly incorporated with the truss assembly of FIG. 1.
Figure 4:
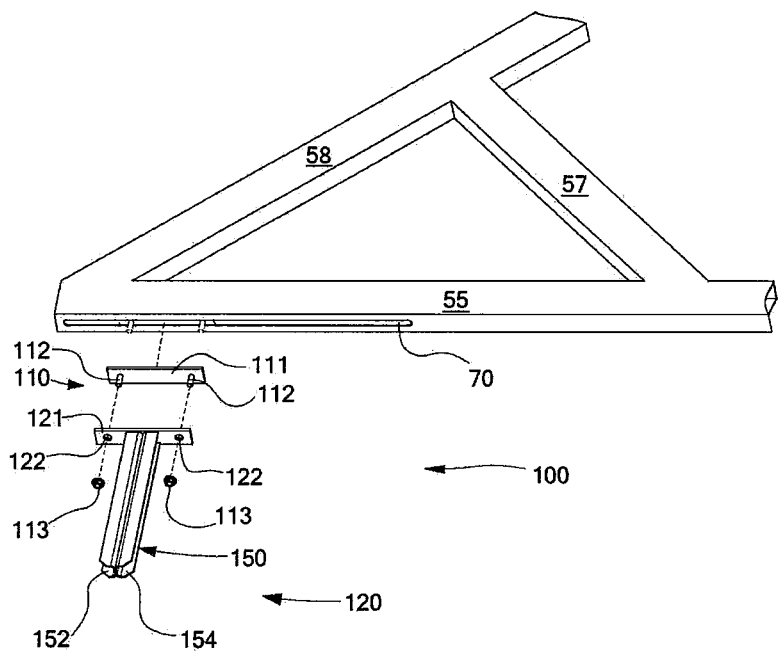
FIG. 4 is an exploded, pictorial, view of the connector assembly of FIG. 3.

FIGS. 1 and 2 two show structural displays having adjustable mounting widths for overhead or otherwise elevated uses in retail environments. Namely, FIG. 1 shows a first embodiment of a structural display which is adjustable for aisles of varying widths in a retail environment, namely, retail display system 5 that is employed in an indoor retail store. FIG. 2 shows a second embodiment of a structural display incorporated as part of a retail display system 5. The structural display seen in FIG. 2 is adjustable to accommodate mounting substrates, such as upright tubing members, that are spaced from each other by varying distances.

Referring still to FIGS. 1 and 2, display system 5 includes multiple merchandise display racks, e.g., first display rack 6 and second display rack 7, each defining a corresponding rack height. It is noted that first and second display racks 6 and 7 are not necessarily racks per se, but also include other suitable display structures including but not limited to any of a variety of shelving, racking, or other merchandise-supporting structures, or others, depending on the particular merchandise that is being displayed. Exemplary of such suitable first and second display racks 6 and 7 include various display racks available from, e.g., the Lozier Corporation of Nebraska or the Madix Corporation of Texas.

Regardless of the particular display racks 6 and 7 that are incorporated into display system 5, in typical implementations, they are arranged on opposing sides of an aisle 8, down which the store patrons or pedestrian consumers walk while looking at merchandise. A width of the aisle 8 is usually between about eight and fourteen feet, for example about eight feet, ten feet, twelve feet, or fourteen feet.

Referring now to FIG. 1, truss assembly 10 can be implemented overhead and at least partially covers aisle 8, by spanning between the first and second display racks 6 and 7, and is configured to accommodate different aisles 8 having the different aisle widths discussed above. Correspondingly, truss assembly 10 can also accommodate a single aisle which has a width that varies along its own length. This feature allows truss assembly 10 to be used with, for example, new installations of display racks 6 and 7, and also previously existing installations of display racks 6 and 7 such as retrofit implementations.

Still referring to FIG. 1, since truss assembly 10 covers aisle 8 by spanning overhead between the first and second display racks 6 and 7, the truss assembly 10 can be visually conspicuous to patrons or pedestrian consumers that are displaced from the aisle 8 that it covers. In other words, truss assembly 10 can be easily seen from store patrons that are, e.g., in an aisle adjacent to aisle 8, multiple aisles away from aisle 8, or in some other part of the store. In this configuration, truss assembly 10 can include various brand or trademark information that can be readily viewed by store patrons at multiple locations in the store. This can be enhanced by providing truss assembly 10 at an elevation that is sufficiently taller than the first and second display racks 6 and 7, and other display racks within the store. For example, truss assembly 10 can have a height that is greater than about one-half, optionally greater than about two-thirds, optionally other ratios, of the height of at least one of the rack heights of the first and second display racks 6 and 7. In other words, the truss assembly 10 can be about three feet tall, five feet tall, greater than five feet tall, or other heights as desired and at least partially based on the particular configuration of the corresponding display racks 6 and 7.

Referring now to FIGS. 1-4, truss assembly 10 includes at least one truss 50 and at least one connecting member which may be provided as connector assembly 100. For implementations that include multiple trusses 50, they can be longitudinally aligned with each other, defining a partially completed or "framed up" house-like appearance in combination. Multiple trusses 50 can be connected to each other with an elongate brace member 51 that can be parallel to the ground. If desired, the elongate brace member 51 can hold one or more lighting fixtures. In some preferred implementations, a conventional track lighting system is implemented so that the track serves as the elongate brace member 51 and is attached to each of the multiple trusses 50. This allows a user to install and position one or more lights within the track of the track lighting system while the track also contributes structural integrity to truss assembly 10 by helping hold at least portions of the trusses 50 in fixed positions with respect to each other.

Still referring now to FIGS. 1-4, each truss 50 includes a horizontal truss member 55 and multiple brace members 57 that extend upwardly and outwardly from the horizontal truss member 55. The brace members 57 extend between and connect the horizontal truss member 55 to first and second gable members 58. Gable members 58 extend from the ends of the horizontal truss member 55 and connect with each other defining an equilateral or other triangular perimeter shape, having a gable-like peak at its top. In this configuration, the areas enclosed by (i) the brace members 57, and respective portions of (ii) the horizontal truss member 55, and (iii) the gable members 58, can define equilateral triangle-like perimeter shapes that are scaled down versions of the overall outer perimeter shape of truss 50.

Referring again to FIGS. 1 and 2, each truss 50 has a void space between, e.g., the truss, brace, and gable members 55, 57, and 58 that can be used to display indicia which can convey branding, trademark, advertising, or other information. For example, a sign 60 can be suspended by chains or ropes from rings that are welded to the gable members 58. This allows the trusses to convey information that corresponds to merchandise being displayed near or under the truss assembly 10.

Referring again to FIGS. 1-4, besides being able to display information that corresponds to merchandise being displayed, trusses 50 are configured to readily mount to any of a variety of display racks 6 and 7, regardless of (i) the width of aisle 8 therebetween (e.g., FIG. 1), or (ii) a distance between mounting substrates such as upright tubing members of the display racks 6 and 7 (e.g., FIG. 2) for example, by way of a cooperative relationship between the trusses 50 and connector assemblies 100. For example, referring now to FIGS. 2 and 3, a portion of the horizontal truss member 55 can be configured to provide an interface between the truss 50 and the connector assembly 100. For example, an elongate slot 70 can extend through a bottom surface of the horizontal truss member 55.

Preferably each of the two ends of horizontal truss member 55 has a slot 70, allowing the truss 50 to have width adjustability at each end in a manner that is explained in greater detail elsewhere herein. Although the slots 70 are preferably provided at the ends of truss member 55, in some implementations there is at least one additional slot 70 provided in a middle portion or otherwise between the ends of the truss member 55. The length of the slot is selected based on the amount of desired transverse adjustability to provide the truss assembly 10. Accordingly, each of the slots 70 can be about ten to fifteen inches, fifteen to twenty-two inches, twenty-two to thirty inches, greater than thirty inches, or other lengths depending at least partially on the particular amount of adjustability that is sought. Regardless of the particular configuration of slot 70, it is configured to cooperate with the connector assembly 100 so that the truss assembly 10 can mount to the first and second display racks 6 and 7, and so in an adjustable manner.

Referring now to FIGS. 3-7, each connector assembly 100 is configured to selectively slide along the length of slot 70 for proving a mounting width for each truss 50 that corresponds to a distance between a corresponding pair of first and second display racks 6 and 7. In this regard, by having connector assemblies 100 that move within slots 70 of the trusses 50, a truss assembly 10 can cumulatively accommodate width variations that may occur along a length of an aisle 8, by individually accommodating any width at a particular truss 50 of the entire truss assembly 10.

Still referring to FIGS. 3-7, each connector assembly 100 includes a sliding base assembly 110 and an insert assembly 120. Sliding base assembly 110 can be at least partially housed within the horizontal truss member 55. For example, sliding base assembly 110 can include a captured plate 111 that is mounted with the truss member 55. Preferably, a bottom surface of captured plate 111 sits directly upon and can slide against an upwardly facing of a bottom wall of the horizontal truss member 55.

Stated another way, the captured plate 111 is located inside the horizontal truss member 55 and slides along the bottom wall through which slot 70 extends. Captured plate 111 is sized and configured to slide within but not rotate within the horizontal truss member 55, ensuring suitable and consistent transverse alignment of the sliding base assembly 110 while it longitudinally traverses the slot 70. Best seen in FIG. 4, one or more threaded stems 112 can extend from a lower surface of the captured plate 111. The threaded stems 112 are aligned with and can extend entirely through the slot 70, beyond the bottom wall of horizontal truss member 55, providing mounting structures that allow the insert assembly 120 to attach to the sliding base assembly 110.

Still referring to FIGS. 3-7, each insert assembly 120 can include an insert end plate 121 that sits on an opposing side of the bottom wall of the horizontal truss member 55, as compared to the sliding base assembly 110. In other words, the bottom wall of horizontal truss member 55 is sandwiched between captured and insert end plates 111 and 121. Insert end plate 121 includes one or more bores 122 that align and are registered with the threaded stems 112 of the sliding base assembly 110. In the complete assemblage of connector assembly 100, the threaded stems 112 insert through the bores 122, extending beyond the insert end plate 121. Correspondingly, nuts 113 can tighten onto the threaded stems 112 and below the insert end plate 121, fastening the captured and insert end plates 111 and 121 to each other. In this configuration, the captured and insert end plates 111 and 121 cooperate in a clamping mechanism-type fashion, allowing the connector assembly 100 to be selectively fixed to the horizontal truss member 55 by way of, e.g., pinch or clamping force application(s).

Referring now to FIGS. 4-7, a projection assembly 150 extends downwardly from the lower surface of insert end plate 121. The projection assemblies 150 can provide the mechanical interfaces between the connector assemblies 100, and thus truss assembly 10, and display racks 6 and 7. In typical implementations, the outside dimensions of the projection assembly 150 are slightly smaller but correspond closely to inside dimensions or cavity/void dimensions within upright tubing members of the display racks 6 and 7.

It is noted that, preferably, the projection assembly 150 not only has certain dimensions allowing its insertion into an upright tubing member of display racks 6 and 7, but also has a perimeter shape that corresponds to the particular display racks 6 and 7 being implemented. Stated another way, the outside perimeter shape of projection assembly 150 corresponds to the inside perimeter shape of upright tubing member or other mounting structure of the display rack 6, 7. Accordingly, if an upright member of a display rack 6, 7 accepts shelf mounting or other hardware therethrough, such that the hardware extends into the void space of the upright member, then the projection assembly 150 includes corresponding clearances that are positioned to avoid non-desired contact with such hardware. For example, projection assembly 150 can include first and second arms 152 and 154 that are configured to insert into upright tubing members of display racks 6 and 7, without interference from any of the typical accessory or mounting structure(s) that can extend into the upright tubing members during typical use.

Figures 5, 6:
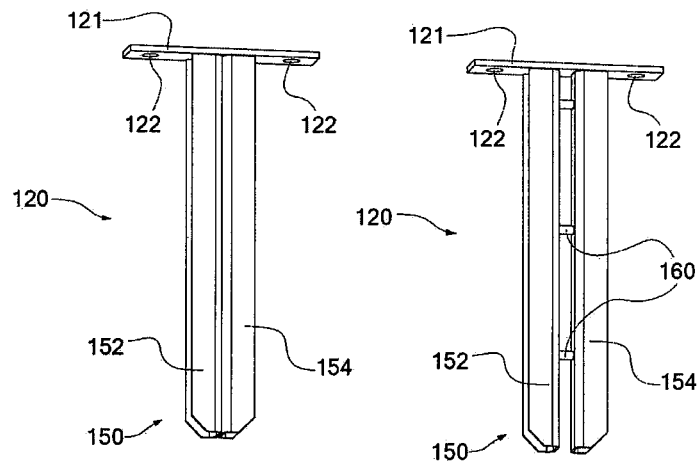
FIG. 5 is a close-up front elevation of a first insert assembly of the invention.
FIG. 6 is a close-up front elevation of a second insert assembly of the invention.
Figures 7, 8:
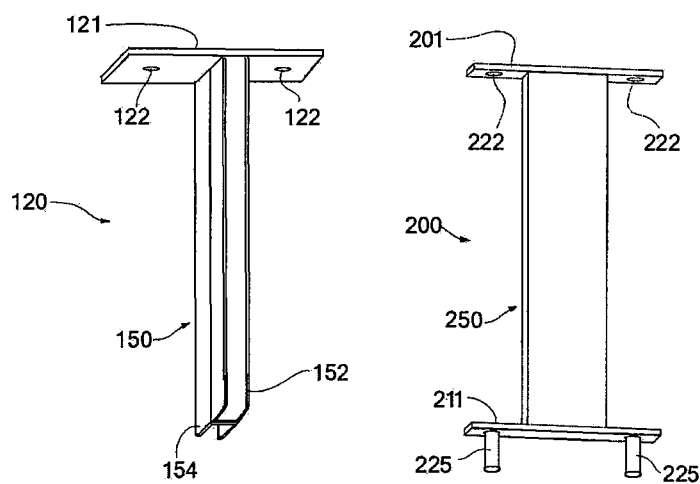
FIG. 7 is a close-up front elevation of a third insert assembly of the invention.
FIG. 8 is a close-up front elevation of a first extender of the invention.

First and second arms 152 and 154 of projection assembly 150 can extend in the same direction and parallel to each other. As best seen in FIGS. 5, 6, and 7 the first and second arms 152 and 154 can be adjacent or juxtaposed with respect to each other, or can be displaced from each other by way of spacers 160 extending therebetween. The particular spacing between the first and second arms, and thus the overall dimensions of the projection assembly 150, correspond to dimensions of the, e.g., upright tubing members of the display racks 6 and/or 7 that the projection assembly 150 inserts into. To allow the projection assembly 150 to clear various hardware that may reside in upright tubing members of the display racks 6 and 7, the first and second arms 152 and 154 can have C-shaped perimeters or channel-stock configurations. In some implementations, the first and second arms 152 and 154 have channels that open facing opposing directions on their respective short-wall segments, e.g., toward the respective bores 122 in the insert end plate 121 (FIGS. 5 and 6) or in directions that are perpendicular with respect to the bores 122 (FIG. 7).

Referring now to FIGS. 5 and 7, the particular orientation of projection assembly 150 with respect to insert end plate 121 depends on the intended end use position of the truss(es) 50 as well as the direction of extension of any interior hardware of the upright tubing members of display racks 6 and 7. In some implementations, when a truss 50 is installed transversely between display racks 6 and 7, the insert assembly 150 can be mounted to insert end plate 121 so that the channels open facing toward the bores 122, as seen in FIG. 5. In other implementations, when a truss 50 is installed longitudinally aligned with and atop a single display rack 6 or 7, the insert assembly 150 can be mounted to insert end plate 121 so that the channels open perpendicularly away from the bores 122, as seen in FIG. 7. Correspondingly, by providing multiple different insert assemblies 120, such as those of FIGS. 5 and 7, truss 50 can have a modular or kit-like configuration that allows mounting the truss 50 transverse and/or longitudinally along or between multiple or a single display rack 6 and 7, as desired.

Referring now to FIG. 8, in some implementations, display system 5 further includes an extender 200 that can provide height adjustability to the truss assembly 10. Extender 200 can be implemented when one or more of display racks 6 and 7 are not as tall as desired for suitably displaying the truss assembly 10 or for providing a desired amount of vertical clearance over aisle 8. Thus, extender 200 can be implemented on truss assemblies 10 that transversely span between display racks 6 and 7 (FIG. 1), for example when the display racks 6 and 7 include back walls or otherwise define rack heights of about six feet or seven feet but when it is also desired to have the lowest portion of trusses 50 that are at least eight feet above the surface of aisle 8. Accordingly, extender 200 can have an overall length of, e.g., 6 inches, 12 inches, 18 inches, 24 inches, 36 inches, or other lengths, depending on the particular rack heights of display racks 6 and 7 as well as the desired end height of trusses 50.

Still referring to FIG. 8, each extender 200 can include opposing end plates 201 and 211 and have a body segment 250 extending therebetween. Similar to insert end plate 122 of insert assembly 120, end plate 201 of extender 200 can include bores 222 that align with and accept the threaded stems 112 of the captured plate 111 therethrough. Furthermore, the other end plate 211 includes threaded stems 225 that serve and analogous function as threaded stems 112 of the captured plate 111. Stated another way, when it is desired to raise the installation height of truss 50, a first end of extender 200 is connected to the sliding base assembly 110 and a second end of extender 200 is connected to the insert assembly 120, increasing the installation height of truss 50 by the length of the extender 200.

In light of the above, to use display system 5, a user evaluates the width of aisle 8 and also the distance(s) between corresponding upright tubing members of display racks 6 and 7. One or more trusses 50 are selected based on such evaluated widths or distances, e.g., for making a truss assembly 10. The one or more trusses are connected to the display racks 6 and 7 by adjusting locations of connector assemblies 100 along the lengths of slots 70 in the trusses 50. For multiple truss 50 implementations, an elongate brace member 51 can be connected to the trusses 50, for example, near the peaks of the gables, holding them together. As desired, a sign 60 can be suspended from a ring or other mounting structure(s) on the trusses for showing indicia that can convey brand, trademark, and/or other information.

While the invention has been shown and described with respect to particular embodiments, it is understood that alternatives and modifications are possible and are contemplated as being within the scope of the present invention. Many changes and modifications could be made to the invention without departing from the spirit thereof. The scope of these changes will become apparent from the appended claims.

What is claimed is:

1. A retail display system, comprising:
   a first merchandise display rack displaying merchandise in a first direction;
   a second merchandise display rack that is parallel to and spaced from the first merchandise display rack, the second display rack displaying merchandise in a second direction that opposes the first direction so that the merchandise being displayed by the first and second merchandise display racks generally face each other;
   a space that is defined between the first and second merchandise display racks and that can accommodate pedestrian consumers so that the pedestrian consumers can enter the space between the first and second merchandise display racks and look at merchandise being displayed by the first and second merchandise display racks;

a truss extending between and connecting the first and second merchandise display racks and spanning over the space therebetween, the truss having first and second ends and an upper member that extends vertically upward between the first and second ends so as to define a maximum height portion, wherein the truss includes a first gable member that extends angularly downward from the maximum height portion of the truss toward the first merchandise display rack at the first end of the truss and a second gable member extends angularly downward from the maximum height portion of the truss toward the second merchandise display rack at the second end of the truss; and at least one connector member including a first portion arranged for captured movement with respect to at least one of the first and second ends of the truss and a second portion extending below the at least one of the first and second ends of the truss and arranged for movement in unison with the first portion of the at least one connector member for coupling the truss to the first and second merchandise display racks.

2. The retail display system of claim 1, wherein the first and second merchandise display racks are adjacent to each other and the truss includes, a generally horizontal truss member having a first end connected to the first gable member to define a first corner fixed at the first end of the truss and arranged proximate the first merchandise display rack and a second end connected to the second gable member to define a second corner fixed at the second end of the truss and arranged proximate the second merchandise display rack.

3. The retail display system of claim 1, wherein the first and second merchandise display racks are adjacent to each other and the truss includes upper and lower portions and defines a space between the upper and lower portions, the retail display system further comprising a sign for conveying trademark or advertising information, the sign being arranged at least partially within the space between the upper and lower portions of the truss, the sign facing away from the space defined between the first and second merchandise display racks so that the sign is visible from outside of the space between the first and second merchandise display racks.

4. An overhead truss assembly for use with a retail display and comprising:

multiple overhead trusses that are parallel to and spaced from each other, the multiple overhead trusses extending over a space in which pedestrian consumers can enter to view merchandise, each of the multiple trusses having first and second end portions that define a truss width therebetween, at least one of the multiple trusses having an upper member that extends vertically upward between the first and second end portions so as to define a maximum height portion, wherein the at least one of the multiple trusses includes a first gable member that extends downwardly from the maximum height portion toward a first merchandise display rack and a second gable member that is connected to the first gable member and extends downwardly from the maximum height portion toward a second merchandise display rack;

an elongate brace member that spans between and connects the multiple overhead trusses to each other; and a connector member that engages at least one of the first and second end portions of at least one of the multiple overhead trusses and is arranged for movement with respect to the maximum height portion for connecting the respective at least one of the multiple overhead trusses to a merchandise display rack.

5. The overhead truss assembly of claim 4, wherein at least one light is mounted to the elongate brace member.

6. The overhead truss assembly of claim 4, wherein the trusses are spaced at least about three feet from each other.

7. The overhead truss assembly of claim 6, wherein the trusses are spaced at least about four feet from each other.

8. The overhead truss assembly of claim 4, wherein the space in which pedestrian consumers can enter to view merchandise is defined be the first and second merchandise display racks, wherein the trusses and the first and second merchandise display racks in combination mimic an appearance of a partially completed house.

9. The overhead truss assembly of claim 4, wherein the overhead truss assembly extends over an aisle that is defined between the first and second adjacent merchandise display racks and wherein an outer truss is defined by one of the trusses that is arranged proximate an end of the aisle and wherein a sign is arranged with respect to the outer truss to face outwardly away from the aisle so that the sign is visible from a location outward of the aisle.

10. A truss for overhead use with a retail display, the truss comprising:

a lower portion engaging a merchandise display rack arranged in a first location in a retail environment, the lower portion including a first end and a second end that is spaced from the first end;

an upper portion connected to and extending away from the lower portion and between the first and second ends, the upper portion of the truss including an upper member that extends vertically upward defining a maximum height; and a sign for conveying trademark or advertising information that is arranged at least partially within a space that is defined between the upper and lower portions of the truss, the sign facing away from the merchandise display rack so that the sign is visible from a second location in the retail environment, wherein the lower portion of the truss includes a horizontal truss member that extends in a generally horizontal direction between the first and second ends, the truss further comprising at least one connector assembly that includes, (i) a captured plate that is slidingly housed in an interior portion of the horizontal truss member; and (ii) an insert assembly connected to and moving in unison with the plate, the insert assembly including an insert end plate, wherein the insert end plate attaches to the captured plate such that a lower wall of the horizontal truss member is sandwiched between the captured and insert end plates such that the insert assembly extends downward away from the lower wall of the horizontal truss member.

11. The truss of claim 10, wherein the captured and insert end plates can be selectively drawn nearer each other, providing a clamping force therebetween and temporarily fixing a location of the at least one connector assembly with respect to the horizontal truss member.

12. The truss of claim 11, wherein a projection assembly extends from a lower surface of the insert end plate and is insertable into an upright member of a display rack.

13. The truss of claim 10, wherein the lower wall of the horizontal truss member includes an elongate slot, opening into the interior portion of the horizontal truss member.

14. The truss of claim 13, wherein the captured plate includes a threaded stem extending therefrom.

15. The truss of claim 14 wherein the threaded stem of the captured plate extends through the insert end plate.

16. The truss of claim 15, wherein a nut is tightened or loosened on the threaded stem of the captured plate for respectively clamping or unclamping the captured and insert end plates against the lower wall of the horizontal truss member.

17. The truss for overhead use with a retail display of claim 10, wherein the lower portion of the truss engages a pair of adjacent merchandise display racks and wherein the maximum height of the truss is arranged between the pair of adjacent merchandise display racks.

\* \* \* \* \*